US012538356B2

(12) United States Patent
Loehr et al.

(10) Patent No.: US 12,538,356 B2
(45) Date of Patent: Jan. 27, 2026

(54) APPARATUSES, METHODS, AND SYSTEMS FOR INCREASING THE TRANSMISSION RELIABILITY FOR TRANSMISSIONS OF A DUPLICATION BEARER IN A SHARED SPECTRUM

(71) Applicant: Lenovo (Singapore) Pte. Ltd., New Tech Park (SG)

(72) Inventors: Joachim Loehr, Wiesbaden (DE); Alexander Johann Maria Golitschek Edler von Elbwart, Darmstadt (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 298 days.

(21) Appl. No.: 18/020,021

(22) PCT Filed: Aug. 4, 2021

(86) PCT No.: PCT/IB2021/057156
§ 371 (c)(1),
(2) Date: Feb. 6, 2023

(87) PCT Pub. No.: WO2022/029651
PCT Pub. Date: Feb. 10, 2022

(65) Prior Publication Data
US 2023/0284274 A1 Sep. 7, 2023

Related U.S. Application Data

(60) Provisional application No. 63/061,127, filed on Aug. 4, 2020.

(51) Int. Cl.
*H04W 74/0816* (2024.01)
*H04L 1/08* (2006.01)

(52) U.S. Cl.
CPC ........... *H04W 74/0816* (2013.01); *H04L 1/08* (2013.01)

(58) Field of Classification Search
CPC ......... H04W 74/0808; H04W 74/0816; H04W 74/0825; H04W 74/0841; H04W 74/085;
(Continued)

(56) References Cited

U.S. PATENT DOCUMENTS

2020/0228438 A1* 7/2020 Loehr .................... H04L 45/24
2021/0218503 A1* 7/2021 Babaei .................... H04L 1/08
2022/0060283 A1* 2/2022 Wang ...................... H04L 1/08

FOREIGN PATENT DOCUMENTS

WO 2020126390 A1 6/2020

OTHER PUBLICATIONS

PCT/IB2021/057156, "Notification of Transmittal of the International Search Report and the Written Opinion of the International Searching Authority, or the Declaration", International Searching Authority, Nov. 3, 2021, pp. 1-14.
(Continued)

*Primary Examiner* — Peter Chen
(74) *Attorney, Agent, or Firm* — Kunzler Bean & Adamson

(57) ABSTRACT

Apparatuses, methods, and systems are disclosed for increasing the transmission reliability for transmissions of a duplication bearer in a shared or unlicensed spectrum. A UE apparatus for a mobile network ("NW") includes a transceiver that initiates a listen before talk procedure ("LBT") on shared spectrum, for transmission of a medium access control ("MAC") protocol data unit ("PDU") containing an original packet data convergence protocol ("PDCP") PDU of a data radio bearer ("DRB") configured for PDCP duplication, wherein PDCP duplication is deactivated for the DRB. The apparatus includes a processor that determines
(Continued)

whether the LBT failed or succeeded and selectively enables PDCP duplication for the DRB in response to determining that the PDCP PDU was not transmitted due to failure of the LBT.

20 Claims, 9 Drawing Sheets

(58) Field of Classification Search
CPC ......... H04W 74/0858; H04W 72/0446; H04W 72/0453; H04L 1/187; H04L 1/1874; H04L 1/08
See application file for complete search history.

(56) References Cited

OTHER PUBLICATIONS

ZTE, "Considerations on PDCP duplication and routing for NR-U", 3GPP TSG RAN WG2 NR #103bis Meeting R2-1813746, Oct. 8-12, 2018, pp. 1-2.

Qualcomm Inc., "Value of UE-based PDCP duplication", 3GPP TSG-RAN WG2 Meeting #108 R2-191583, Nov. 18-22, 2019, pp. 1-4.

ZTE et al., "On the scope of unlicensed band URLLC/IIoT operation", 3GPP TSG RAN Meeting #88e RP-200816, Jun. 29-Jul. 3, 2020, pp. 1-4.

3GPP, "3rd Generation Partnership Project; Technical Specification Group Services and System Aspects; Study on Communication for Automation in Vertical Domains (Release 16)", 3GPP TR 22.804 V16.3.0, Jul. 2020, pp. 1-197.

3GPP, "3rd Generation Partnership Project; Technical Specification Group Services and System Aspects; Study on enhancement of 5G System (5GS) for vertical and Local Area Network (LAN) services (Release 16)", 3GPP TR 23.734 V16.2.0, Jun. 2019, pp. 1-117.

3GPP, "3rd Generation Partnership Project; Technical Specification Group Radio Access Network; Physical layer procedures for shared spectrum channel access (Release 16)", 3GPP TS 37.213 V16.2.0, Jun. 2020, pp. 1-26.

3GPP, "3rd Generation Partnership Project; Technical Specification Group Radio Access Network; NR; Radio Link Control (RLC) protocol specification (Release 16)", 3GPP TS 38.322 V16.0.0, Mar. 2020, pp. 1-33.

* cited by examiner

APPARATUSES, METHODS, AND SYSTEMS FOR INCREASING THE TRANSMISSION RELIABILITY FOR TRANSMISSIONS OF A DUPLICATION BEARER IN A SHARED SPECTRUM

FIELD

The subject matter disclosed herein relates generally to wireless communications and more particularly relates to apparatuses, method, and systems for increasing the transmission reliability for transmissions in a network ("NW") that supports shared spectrum.

BACKGROUND

Some wireless communications systems support packet duplication for both user plane data, as well as control plane data, in order to increase the reliability of transmissions, i.e., by having the diversity gain. Duplication is a function of the Packet Data Convergence Protocol ("PDCP") layer, e.g., PDCP Protocol Data Units ("PDUs") are duplicated. Services that benefit from duplication include URLLC or Signaling Radio Bearers ("SRBs"). In various systems, a network ("NW") configures a data radio bearer ("DRB") for packet data convergence protocol ("PDCP") duplication and the NW may activate or deactivate PDCP duplication. In existing systems, a user equipment ("UE") performs PDCP duplication in accordance with the configuration and activation/deactivation provided by the NW.

BRIEF SUMMARY

Apparatuses for increasing the transmission reliability for transmissions of a duplication bearer (e.g., a data radio bearer ("DRB") configured for packet data convergence protocol ("PDCP") duplication) in a shared spectrum. In one or more embodiments, a User Equipment ("UE") apparatus for a mobile network ("NW") includes a transceiver that initiates a listen before talk procedure ("LBT") on shared spectrum, for transmission of a medium access control ("MAC") protocol data unit ("PDU") containing an original packet data convergence protocol ("PDCP") PDU of a data radio bearer ("DRB") configured for PDCP duplication, wherein PDCP duplication is deactivated for the DRB. The apparatus further includes a processor that: determines whether the LBT failed or succeeded; and selectively enables PDCP duplication for the DRB in response to determining that the PDCP PDU was not transmitted due to failure of the LBT. Various methods and systems may perform the functions of the apparatus.

A method for increasing the transmission reliability for transmissions of a duplication bearer (e.g., a DRB configured for PDCP duplication) that supports shared spectrum. In one or more embodiments, the method includes initiating a listen before talk procedure ("LBT") on shared spectrum, for a transmission of a medium access control ("MAC") protocol data unit ("PDU") containing an original packet data convergence protocol ("PDCP") PDU of a data radio bearer ("DRB") configured for PDCP duplication, wherein PDCP duplication is deactivated for the data radio bearer. In various embodiments, the method further includes determining whether the LBT failed or succeeded and selectively enabling PDCP duplication for the DRB in response to determining that the PDCP PDU was not transmitted due to failure of the LBT.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
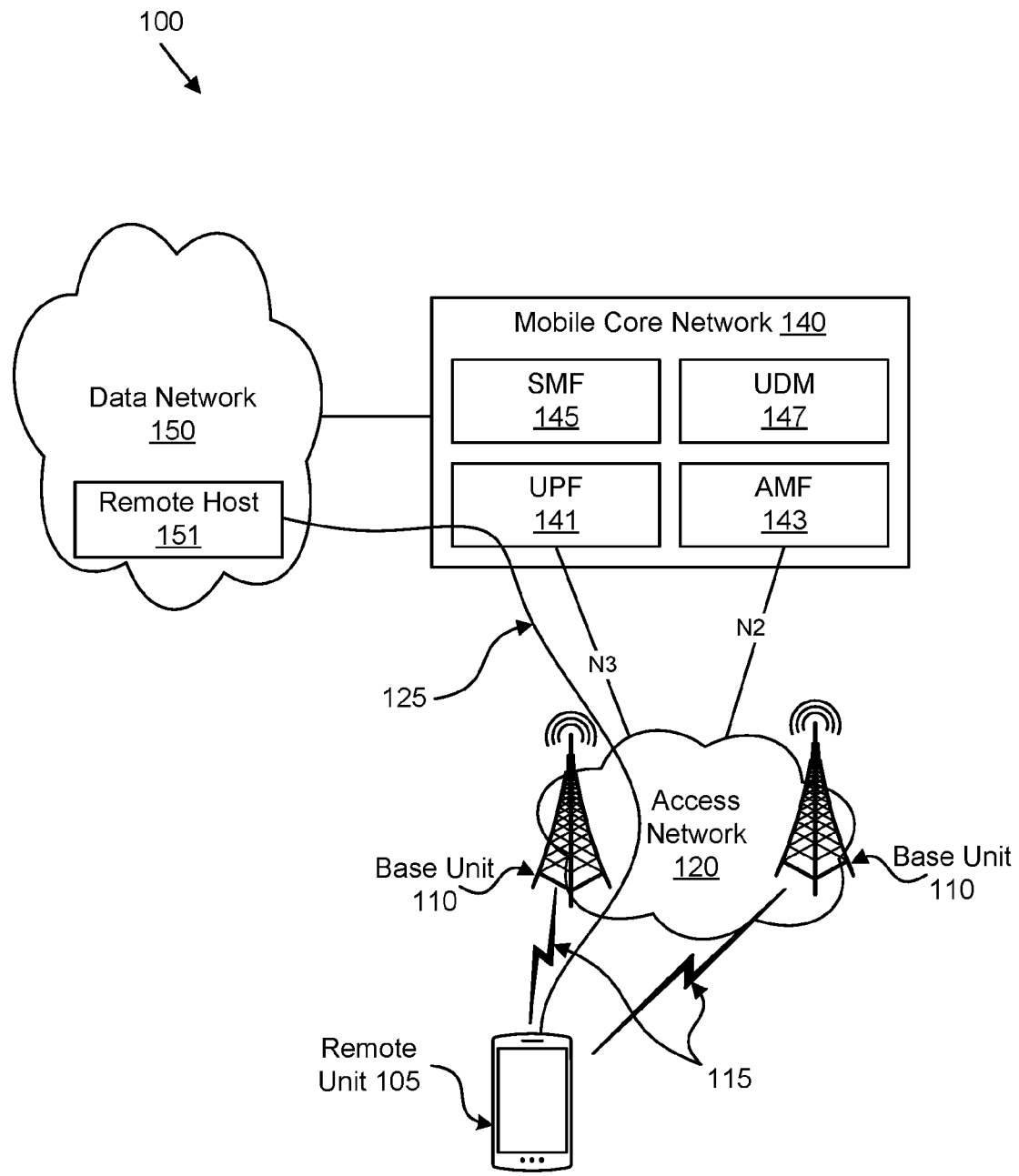
FIG. 1 is a schematic block diagram illustrating a wireless communication system for selectively enabling PDCP duplication for a data radio bearer in a network that supports shared spectrum, in accordance with one or more embodiments of the disclosure.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer, for example, through the Internet using an Internet Service Provider ("ISP").

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatuses or other devices to produce a computer implemented process such that the code which execute on the computer or other programmable apparatus provide processes for implementing the functions/ acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating a wireless communication system 100 for selectively enabling PDCP duplication for a data radio bearer in a network 120 that supports shared spectrum, in accordance with one or more embodiments of the disclosure. according to embodiments of the disclosure. In one embodiment, the wireless communication system 100 includes at least one remote unit 105, an access network 120 containing at least two base units 110, wireless communication links 115, and a mobile core network 140. Even though a specific number of remote units 105, access networks 120, base units 110, wireless communication links 115, and mobile core networks 140 are depicted in FIG. 1, one of skill in the art will recognize that any number of remote units 105, access networks 120, base units 110, wireless communication links 115, and mobile core networks 140 may be included in the wireless communication system 100. In another embodiment, the access network 120 contains one or more WLAN (e.g., Wi-Fi™) access points.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the wireless communication links 115.

In some embodiments, the remote units 105 may communicate with a remote host 151 via a data path 125 that passes through the mobile core network 140 and a data network 150. For example, a remote unit 105 may establish a PDU connection (or a data connection) to the data network 150 via the mobile core network 140 and the access network 120. The mobile core network 140 then relays traffic between the remote unit 105 and the remote host 151 using the PDU connection to the data network 150.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 120, that may include one or more controllers communicably coupled to one or more corresponding base units 110. These and other elements of the radio access network are not illustrated, but are well known generally by those having ordinary skill in the art. The base units 110 connect to the mobile core network 140 via the access network 120.

The base units 110 may serve a number of remote units 105 within a serving area, for example, a cell or a cell sector via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a data network 150, like the Internet and private data networks, among other data networks. Each mobile core network 140 may belong to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple control plane functions including, but not limited to, an Access and Mobility Management Function ("AMF") 143, a Session Management Function ("SMF") 145, and a Policy Control Function ("PCF"). Additionally, the mobile core network 140 includes a user plane function ("UPF") 141 and a Unified Data Management ("UDM") 147. Although specific numbers and types of network functions are depicted in FIG. 1, one of skill in the art will recognize that any number and type of network functions may be included in the mobile core network 140.

Disclosed herein are methods, systems, and apparatuses for efficient activation/deactivation of PDCP duplication for both CA- and DC-based architectures. To efficiently activate and/or deactivate packet duplication (e.g., PDCP duplication), a base unit 110 signals to the remote unit 105, e.g., a first control signal. This signaling may be PDCP control signaling, MAC control signaling, or RRC signaling. For 3GPP networks, the 5G radio Radio Access Technology ("RAT") (referred to as New Radio, "NR") supports packet duplication for data on both the user plane and the control plane, e.g., in order to increase the reliability of transmissions by having the diversity gain. As mentioned above, this packet duplication is a function of the PDCP layer, such that PDCP PDUs are duplicated.

PDCP duplication benefits services such as URLLC, where transmission reliability and latency enhancements are two key aspects. Moreover, redundancy/diversity schemes in Carrier Aggregation ("CA") scenarios can be used to reach the reliability and latency requirements of URLLC. For URLLC, two independent transmission channels on different carriers may be needed for extreme-reliability cases such as error rates of $10^{-5}$ to $10^{-9}$ within a given latency bound. Here, duplication based on CA is a tool available to the scheduler to further improve the transmission reliability. However, where reliability on one of the carriers cannot be guaranteed, it is thus beneficial to have further carrier(s) available. As an example, such a situation may be due to a temporary outage/fading dip, due to unanticipated change or wrong channel state information.

Packet duplication may be also applied based on Dual Connectivity ("DC") architecture, e.g., split bearer operation with PDCP duplication. In a general sense, packet duplication may be used together with different diversity schemes involving more than one radio link to serve a UE. While the below embodiments focus on DC and CA scenarios, the present disclosure is not intended to be limited to those implementations.

Generally, packet duplication is limited to those situations where the extra reliability is needed, e.g., dynamic activation/deactivation. Here, PDCP control signaling or MAC control signaling (e.g., MAC control element ("CE")) may be used to activate/deactivate the PDCP duplication. Beneficially, this also reduces the overhead of activation/deactivation of the PDCP duplication. Currently, PDCP duplication is generally configured and activated/deactivated by the NW but there are no procedures for a UE to selectively and/or autonomously active/deactivate PDCP duplication in a flexible, dynamic manner in a shared spectrum where LBT procedures are performed before transmission.

In one embodiment, the remote unit 105 is configured with a split bearer, e.g., for dual connectivity. In such embodiments, the default state for PDCP duplication at the split bearer may be deactivated, wherein the base unit 110 explicitly activates PDCP duplication by sending the first control signal. In another embodiment, the remote unit 105 communicates with the access network 120 using carrier aggregation, the remote unit 105 being configured with at least one bearer which has a PDCP entity which is associated with two logical channels/RLC entities being mapped to different serving cells. In such embodiments, the default state for PDCP duplication of the bearer may be deactivated, wherein the base unit 110 explicitly activates PDCP duplication by sending the first control signal.

In one embodiment when duplication is selectively activated or enabled by the remote unit 105, the remote unit 105 removes PDCP PDUs from transmission buffer associated with one logical channel/RLC entity which were already successfully transmitted via the other logical channel/RLC entity, e.g., in order to avoid that the transmission buffer is piling up. The removal (discarding) of packets may be based on received RLC status reports, according to one or more embodiments. Here, a RLC layer at the remote unit 105 informs a PDCP layer about the successfully transmitted PDCP PDUs. The PDCP layer may then send a PDCP discard notification to the other RLC entity. Further details about discarding of duplicated PDCP PDUs and related PDUs at other layer is provided below with respect to FIGS. 4, 5, and 6.

A Work Item Description WID for Rel-17 titled "Enhanced Industrial Internet of Things (IoT) and ultra-reliable and low latency communication ("URLLC") support for NR" describes industrial usage of mobile networks where ultra-reliable and low latency communication are important.

The achievable latency and reliability performance of NR may need to be extended to support use cases with tighter requirements. In order to extend the NR applicability in various verticals, the SI of NR Industrial Internet of Things ("IIoT") has concluded that certain enhancements of RAN features in different layers should be specified for Rel-16. A Release 16 work item delivered part of the intended enhancements and also email discussions prior RAN #86 identified additional improvement needs, which are reflected in the Release 17 WI.

In Technical Specification Group Service and System Aspects ("TSG-SA") certain side enhancements for supporting Time-Sensitive Communications ("TSC") as defined in TR 23.734 are considered to enable accessing market beyond a Time-Sensitive Networking ("TSN") solution included in Release 16 (which can address only a small part of the industrial automation market).

The support of unlicensed operation needs checking if Release 16 features need any additions to enable operation on Frequency Range 1 (410 MHz-7125 MHz) ("FR1"), especially in controlled environments, which assumes an environment which contains only devices operating on the unlicensed band installed by the facility owner and where unexpected interference from other systems and/or radio access technology happens only sporadically.

Certain aspects to support an enhanced Industrial Internet of Things (IIoT) together with ultra-reliable and low latency communication ("URLLC") support for NR where further specifications and new apparatuses and methods would be beneficial include the following:

1) Required Physical Layer feedback enhancements for meeting URLLC requirements such as: a) UE feedback enhancements for HARQ-ACK; b) CSI feedback enhancements to allow for more accurate MCS selection.
2) Uplink enhancements for URLLC in unlicensed controlled environments such as a) Support for UE-initiated COT for FBE with minimum specification effort; and b) Harmonizing UL configured-grant enhancements in NR-U and URLLC introduced in Rel-16 to be applicable for unlicensed spectrum.

3) Intra-UE multiplexing and prioritization of traffic with different priority such as: a) multiplexing behavior among HARQ-ACK/SR/CSI and PUSCH for traffic with different priorities, including the cases with UCI on PUCCH and UCI on PUSCH; and b) PHY prioritization of overlapping dynamic grant PUSCH and configured grant PUSCH of different PHY priorities on a BWP of a serving cell including the related cancelation behavior for the PUSCH of lower PHY priority, taking the solution developed during Rel-16 as the baseline.
4) Enhancements for support of time synchronization such as: a) RAN impacts of SA2 work on uplink time synchronization for TSN; and b) Propagation delay compensation enhancements (including mobility issues, if any).
5) RAN enhancements based on new QoS related parameters if any, e.g., survival time, burst spread, decided in SA2.

Accordingly, this disclosure addresses the following issues regarding RAN enhancements based on new QoS related parameters, e.g., survival time, in the context of PDCP duplication in a shared or unlicensed spectrum, where a communication latency and reliability target is to be achieved: a) reducing the impact of LBT failures for the transmission of PDCP duplicates for reliability and latency critical URLLC traffic; and b) avoiding the expiry of a survival timer associated with a bearer due to LBT failures.

PDCP Duplication/Support of Survival Time

PDCP duplication is a beneficial feature adopted by Rel-15 to facilitate URLLC, which can be conducted in both downlink and uplink. The NR IIoT Study Item aims to further enhance such feature in order to improve both performance and efficiency of the scheme. In the objective of the Study Item on NR Industrial Internet of Things (NR-IIoT), the following has been approved: "Enhancements (e.g., for scheduling) to satisfy QoS for wireless Ethernet when using TSN traffic patterns as specified in TR 22.804". The survival time is a new QoS parameter introduced by IIoT applications related to the application availability. It can be viewed as an ultimate "rescuing" period available after a message failure before the application is declared "unavailable". It is best explained by the following excerpt from TR22.804.

Figure 2:
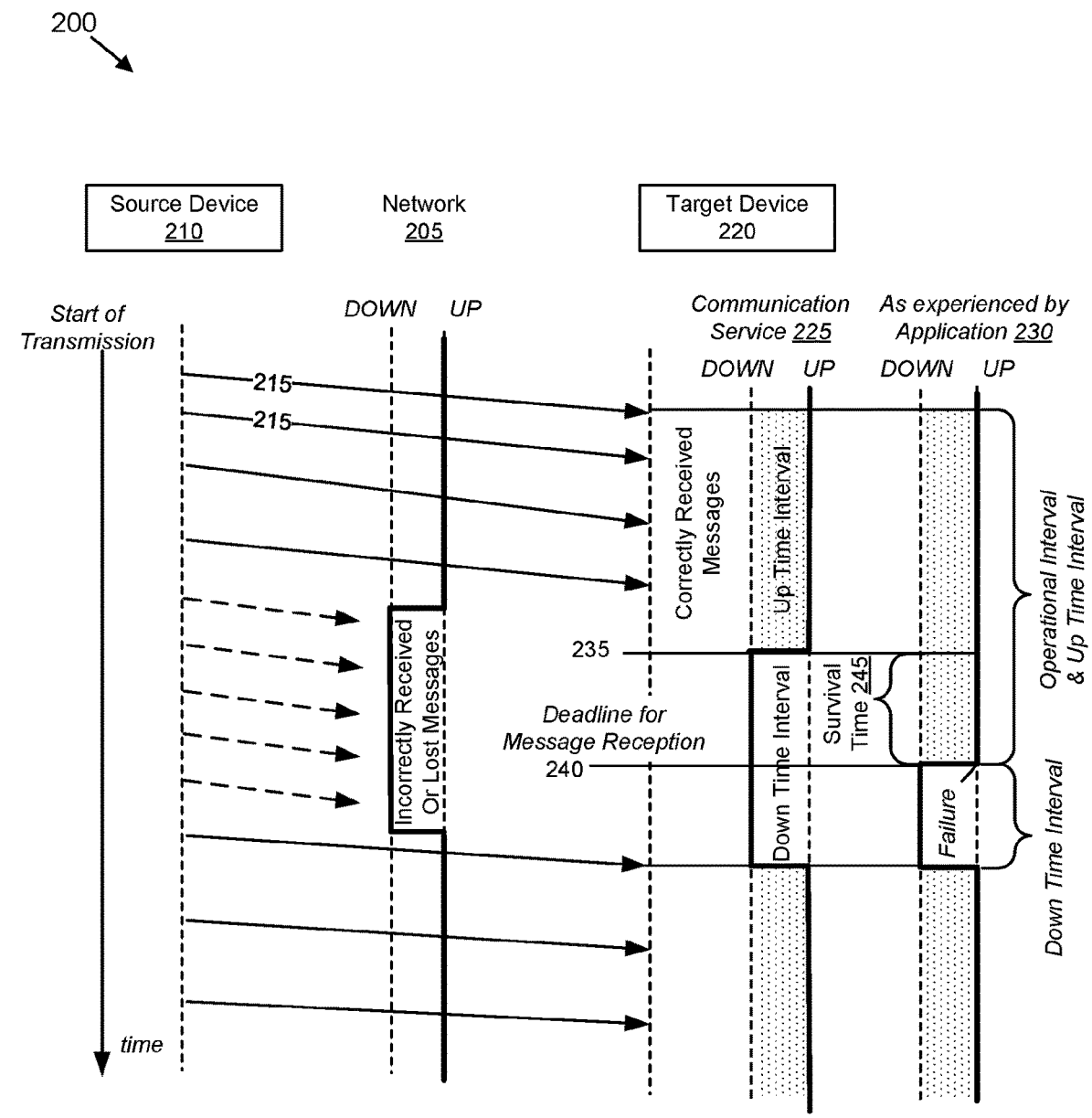
FIG. 2 is a timing diagram illustrating up time, down time and up state, down state, also showing survival time, in accordance with one or more embodiments of the disclosure.

FIG. 2 is a timing diagram illustrating up time, down time and up state, down state, also showing survival time, in accordance with one or more embodiments of the disclosure. The flow of events in FIG. 2 is as follows. The network 205 is up and running (solid vertical line underneath the word "UP" indicates up state). A source device 210 starts sending messages 215 (sloping arrows) to a target device 220, on which an automation function e.g., an application 230 is running. A communication service 225 is, from the point of view of the target application 230, in an up state (solid vertical line is shown under "UP"). The up/down state of the application 230 is based on correctly received messages 215. Note that the up time interval of the application 230 starts later than the up state of the network 205, i.e., with the receipt of the first message 215 from the source device 210.

The network 205 transitions into a down state if it no longer can support end-to-end transmission of the source device's messages 215 to the target device 220 according to the negotiated communication QoS. Once the application 230 on the target device 220 senses the absence of expected messages ("Deadline for expected message" 235 in FIG. 2), it will wait a pre-set period before it considers the communication service to be unavailable ("Deadline for message reception" 240 in FIG. 2). This is the so-called survival time 245. The survival time 245 can be expressed as a period of time or, especially with cyclic traffic, as a maximum number of consecutive incorrectly received or lost messages. If the survival time 245 has been exceeded, the application transitions the status of the communication service into a down state (solid line of application 230 changes to DOWN in FIG. 2).

The application will usually take corresponding actions for handling such situations of unavailable communication services. For instance, it will commence an emergency shutdown. Note that this does not imply that the target application is shut off; rather it transitions into a predefined state, e.g., a safe state. As a general rule, the target application 230 still "listens" to incoming packets or may try to send messages to the source device 210 or source application. Once the network 205/communication service 225 is in the up state again (solid line in FIG. 2 changes to UP), the communication service state as perceived by the target application will change to the up state.

The communication service 225 is thus again perceived as available (solid line of communication service changes to UP in FIG. 2) as soon as a message is correctly received by the application at the target device. The state of the application, however, depends on the counter measures taken by the application. The application might stay in down state if it is in a safe state due to an emergency shutdown. Or, the application may do a recovery and change to up state again.

Figure 3:
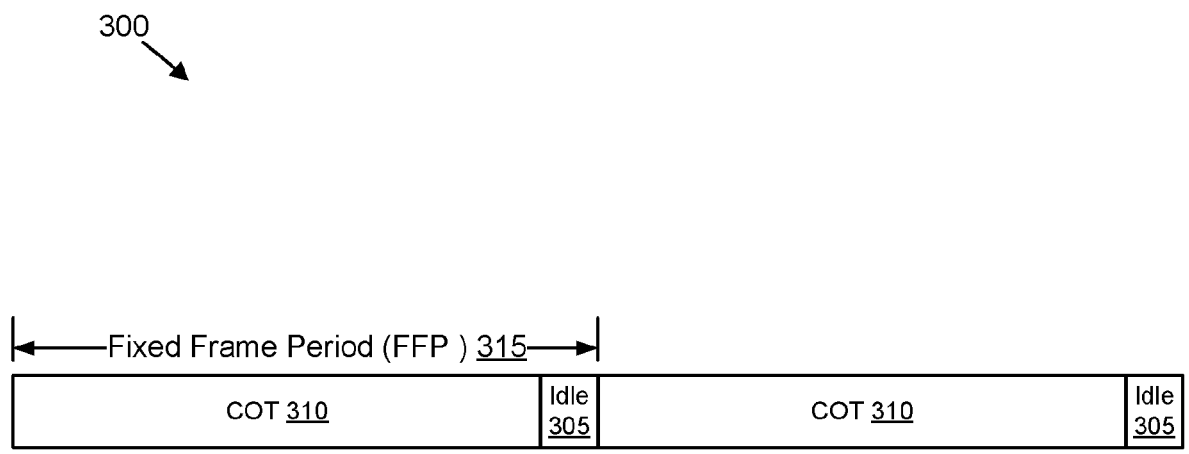
FIG. 3 is a timing diagram illustrating a fixed frame period structure, in accordance with one or more embodiments of the disclosure.

FIG. 3 is a timing diagram illustrating a fixed frame period structure 300, in accordance with one or more embodiments of the disclosure. In a FBE (frame based equipment) mode of operation, the remote unit 105 or base unit 110 (e.g., device/network node) performs LBT in an idle period 305 and once acquired, the channel/medium, the device/network node can communicate within the non-idle time of a fixed frame period ("FFP") 315 duration (referred to as channel occupancy time (COT) 310). In certain specifications/regulations, the idle period 305 is not shorter than the maximum of 5% of the FFP 315 and 100 microseconds.

Figure 4:
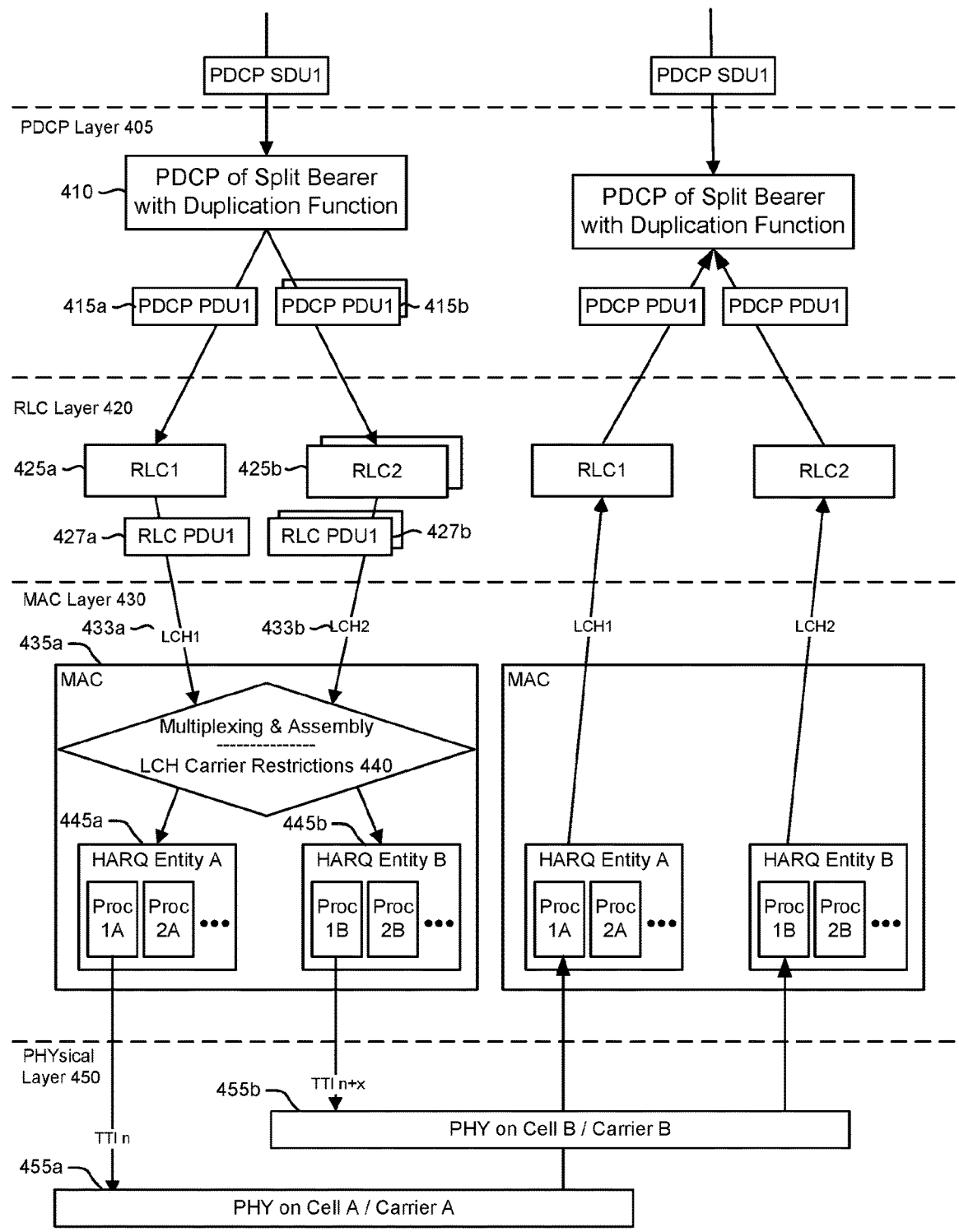
FIG. 4 is a diagram illustrating PDCP duplication in a case of carrier aggregation, in accordance with one or more embodiments of the disclosure.

FIG. 4 is a diagram illustrating PDCP duplication 400 in a case of carrier aggregation ("CA"), in accordance with one or more embodiments of the disclosure. The depicted example illustrates PDCP PDU duplication which may be configured, enabled, activated, and/or deactivated by the NW or, in accordance with one or more embodiments of the present disclosure, may be selectively enabled (e.g., autonomously) by a UE in response to a failed LBT. It may be noted that references to PDCP PDUs duplicates 415 may in certain embodiments, such as for example, embodiments describing the total number of PDCP PDU generated for transmission refer to both the original PDCP PDU 415a and the one or more duplicated PDCP PDUs 415b because the original PDCP PDUs and the duplicated PDCP PDUs are essentially the same.

For the PDCP duplication 400 illustrated for CA, cell restriction functionality 440 is introduced in order to ensure that the same PDCP PDUs (original PDCP PDU 415a and duplicate PDCP PDU 415b) are not transmitted on the same cell/carrier, e.g., to ensure that original PDCP PDU 415a and its duplicate PDCP PDU 415b are not both transmitted on CellA/CarrierA 455a and are not both transmitted on CellB/CarrierB 455b, which would effectively eliminate diversity gain that would occur, for example, by transmitting the original PDCP PDU 415a on Cell A/Carrier A 455a and transmitting the one or more duplicate PDCP PDU 415b on a different cell/carrier such as Cell B/Carrier B 455b. In various embodiments, such LCH carrier restrictions 440 for logical channels ("LCHs") associated with a duplication radio bearer may be configured with an information element ("IE") allowedServingCells indicating on which cells/carriers data of a particular logical channel can be transmitted. In some embodiments, other signals or messages known to one of skill in the art may be used to configure LCH carrier restrictions or other duplication parameters.

Operation in Unlicensed Spectrum

Devices/network nodes such as UEs and gNBs operating in unlicensed/shared spectrum may be required to perform a Listen-Before-Talk ("LBT") procedure, e.g., channel sensing, or clear channel assessment ("CCA") prior to being able to transmit in the unlicensed spectrum. If the device/network node performing LBT does not detect the presence of other signals in the channel, the medium/channel is considered available for transmission.

Unlicensed/Shared Spectrum Terminologies

The following terminologies are defined as follows:

A channel refers to a carrier or a part of a carrier consisting of a contiguous set of resource blocks ("RBs") on which a channel access procedure is performed in shared spectrum.

Like LBT, a channel access procedure ("CAP") is a procedure based on sensing that evaluates the availability of a channel for performing transmissions. The basic unit for sensing is a sensing slot with a duration $T_{sl}$=9 us. The sensing slot duration $T_{sl}$ is considered to be idle if an eNB/gNB or a UE senses the channel during the sensing slot duration, and determines that the detected power for at least 4 us within the sensing slot duration is less than energy detection threshold $X_{Thresh}$. Otherwise, the sensing slot duration $T_{sl}$ is considered to be busy.

A channel occupancy refers to transmission(s) on channel(s) by eNB/gNB/UE(s) after performing the corresponding channel access procedures (e.g., as described in 3GPP TS 37.213).

A Channel Occupancy Time (e.g., such as COT 310 depicted in FIG. 3) refers to the total time for which eNB/gNB/UE and any eNB/gNB/UE(s) sharing the channel occupancy perform transmission(s) on a channel after an eNB/gNB/UE performs the corresponding channel access procedures described in this clause. For determining a Channel Occupancy Time, if a transmission gap is less than or equal to 25 us, the gap duration is counted in the channel occupancy time. A channel occupancy time can be shared for transmission between an eNB/gNB and the corresponding UE(s).

A DL transmission burst is defined as a set of transmissions from an eNB/gNB without any gaps greater than 16 us. Transmissions from an eNB/gNB separated by a gap of more than 16 us are considered as separate DL transmission bursts. An eNB/gNB can transmit transmission(s) after a gap within a DL transmission burst without sensing the corresponding channel(s) for availability.

A UL transmission burst is defined as a set of transmissions from a UE without any gaps greater than 16 us. Transmissions from a UE separated by a gap of more than 16 us are considered as separate UL transmission bursts. A UE can transmit transmission(s) after a gap within a UL transmission burst without sensing the corresponding channel(s) for availability.

As shown in Table 1 below, four Channel Access Priority Classes are defined which can be used when performing uplink and downlink transmissions in Licensed Assisted Access ("LAA") carriers (see 3GPP TS 37.213 Table 4.2.1-1).

TABLE 1

Channel Access Priority Class for UL

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE 1:
For p = 3,4, n $T_{ulm\ cot,p}$ = 10 ms if the higher layer parameter 'absenceOfAnyOtherTechnology-r14' indicates TRUE, otherwise, $T_{ulm\ cot,p}$ = 6 ms.
NOTE 2:
When $T_{ulm\ cot,p}$ = 6 ms it may be increased to 8 ms by inserting one or more gaps. The minimum duration of a gap shall be 100 μs. The maximum duration before including any such gap shall be 6 ms.

For uplink transmissions that are dynamically scheduled, the eNB/gNB/base station selects the Channel Access Priority Class taking into account the lowest priority QoS Class Identifier ("QCI") in a Logical Channel Group ("LCG"). For UE-initiated uplink transmission on configured grant resources respectively for AUL transmissions, the UE selects the lowest channel access priority class (i.e., highest signaled value) of the logical channel with MAC SDU multiplexed into the Medium Access Control ("MAC") PDU. MAC Control Elements ("CEs"), other than padding buffer status report ("BSR") use the highest channel access priority class (i.e., lowest signaled value).

Since exceeding the survival time 245 (shown in FIG. 2) has quite severe consequences, i.e., the status of the communication service 225 transitions to a "down state", it is beneficial to ensure that transmissions of delay sensitive applications, e.g., TSN traffic flows, are correctly received within the end-to-end latency budget in order to avoid the unavailable time, i.e., a down state. Therefore, the Radio Access Network ("RAN") beneficially reacts quickly to increase the reliability of the wireless link for the concerned traffic flow(s), in particular when operated in a shared or unlicensed spectrum where LBT failures may occur for uplink transmissions. The present disclosure includes several embodiments which allow a fast reaction to LBT failures over the wireless channel by a UE dynamically and selectively enabling PDCP duplication.

Various embodiments of the apparatuses, and methods described below beneficially increase the transmission reliability for high reliable transmission in a shared spectrum in order to avoid e.g., a situation such as depicted in FIG. 2 where an attempted transmission exceeds the survival time 245, which would in turn trigger the application to transition the status of the communication service 225 into a down state. The various embodiments may also be applicable for a situation in which the communication service 225 is a DOWN state, so as to quickly recover and bring the communication service 225 status back to the UP state.

Figure 5:
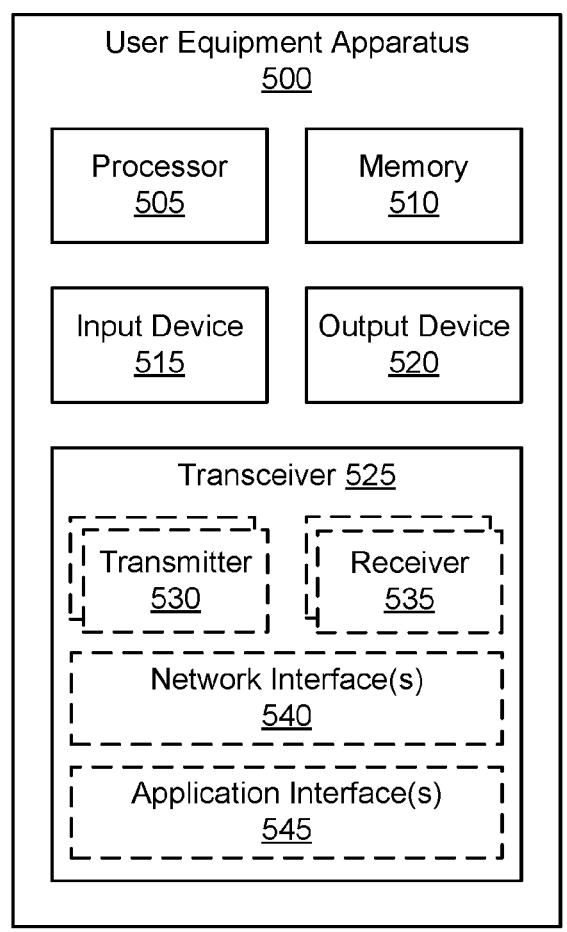
FIG. 5 is a block diagram illustrating a user equipment apparatus that may be used for selectively enabling PDCP duplication for a data radio bearer in a network that supports shared spectrum, in accordance with one or more embodiments of the disclosure.

FIG. 5 depicts a user equipment apparatus 500 that may be used for selectively enabling duplication of PDCP PDUs for a radio bearer, according to one or more embodiments of the disclosure. The user equipment apparatus 500 may include an instance of the remote unit 105 and/or UE 205. Furthermore, the user equipment apparatus 500 may include a processor 505, a memory 510, an input device 515, an output device 520, and a transceiver 525. In some embodiments, the input device 515 and the output device 520 are combined into a single device, such as a touch screen. In certain embodiments, the user equipment apparatus 500 does not include any input device 515 and/or output device 520.

As depicted, the transceiver 525 includes at least one transmitter 530 and at least one receiver 535. Additionally, the transceiver 525 may support at least one network interface 540. Here, the at least one network interface 540 facilitates communication with an eNB or a gNB (e.g., using the Uu interface). Additionally, the at least one network interface 540 may include an interface used for communications with an UPF and/or AMF.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

Referring again to FIG. 4, as well as to FIG. 5, in some embodiments, the processor 505 establishes a radio bearer to communicate with a mobile communication network. Here, the radio bearer includes a PDCP protocol entity 410 at the PDCP layer 405 of a protocol stack, a first RLC protocol entity 425a and one or more second RLC protocol entities 425b being associated with the PDCP protocol entity 410, a first logical channel LCH1 being associated with said first RLC protocol entity 425a, and a second logical channel LCH2 being associated with the second RLC protocol entity 425b. In various embodiments, at the MAC layer 430, the radio bearer may include a MAC entity 435a that takes into account LCH carrier restrictions 440 when performing multiplexing and assembly. The MAC entity 435a may include a first HARQ entity 445a and a second HARQ entity 445b associated respectively with first and second PHYs 455a, 455b in physical layer 450.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media. In some embodiments, the memory 510 stores data relating to duplicating PDCP PDUs for a radio bearer, for example storing indications to activate/deactivate packet duplication, indications of successful transmission of PDCP data PDUs, and the like. In certain embodiments, the memory 510 also stores program code and related data, such as an operating system or other controller algorithms operating on the user equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

The transceiver 525 communicates with one or more network functions of a mobile communication network. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages. The transceiver 525 may include one or more transmitters 530 and one or more receivers 535.

Figure 6:
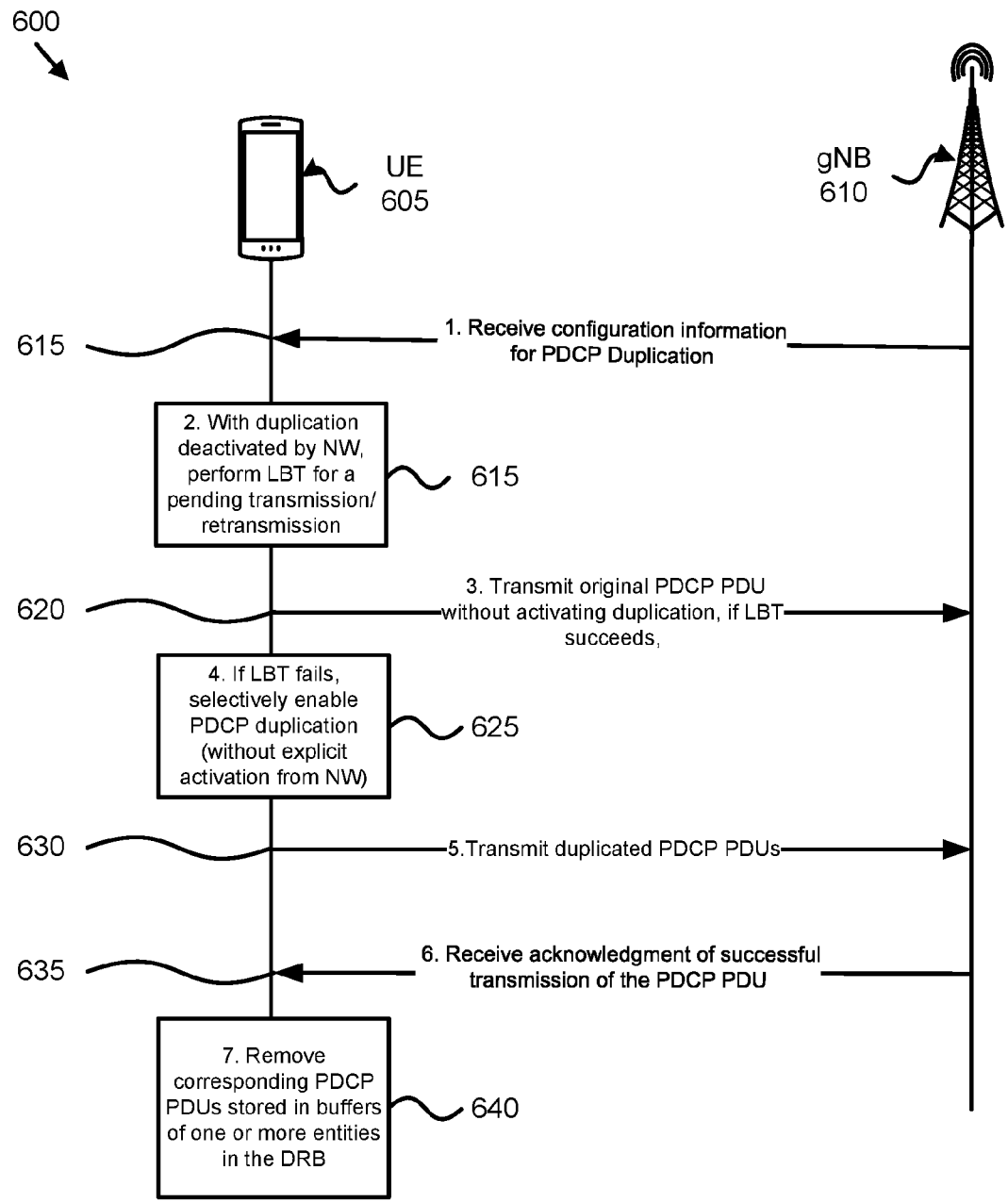
FIG. 6 is a diagram illustrating certain actions of UE for selectively enabling PDCP duplication for a data radio bearer in a network that supports shared spectrum, in accordance with one or more embodiments of the disclosure.

FIG. 6 is a diagram 600 illustrating an overview of certain actions of UE for selectively enabling PDCP duplication for a data radio bearer in a network that supports shared spectrum, in accordance with one or more embodiments of the disclosure.

In various embodiments, a UE 500, 605 receives configuration information (e.g., from a NW e.g., via a gNB 610) for a duplication bearer (e.g., a DRB configured for PDCP duplication). For shared spectrum, the UE 500, 605 performs a LBT 615 for a pending transmission/retransmission. If the LBT is successful, the UE 500, 605, transmits 620 the original PDCP PDU and in various embodiments, removes corresponding duplicate PDCP PDUs that may have been pre-generated and stored at one or more RLC entities. In one or more embodiments, if the LBT fails, the UE 500, 605 selectively enables 625 duplicate PDCP transmission in accordance with one or more embodiments of the disclosure, such as in one or more of the six embodiments described in the sections that follow. In some embodiments, in the case of such LBT failures, the UE 500, 605 further transmits or retransmits the one or more duplicated PDCP PDUs stored in the RLC entities, until, in certain embodiments, the UE 500, 605 receives 635 an acknowledgement that the transmission was successful and removes corresponding duplicate PDCP PDUs from the buffer of or more entities (e.g., PDCP, RLC, MAC) in the DRB. It may be noted that in the following section, reference is made to various elements depicted in various figures such as FIGS. 4, 5, and 6.

According to a first embodiment, configuration information received by the remote unit e.g., UE 605, indicates which of the associated Radio Link Control ("RLC") entities (e.g., 425a, 425b) or LCHs (e.g., LCH1 433a, LCH2 433b) are to be used for PDCP duplication as well as the maximum number of PDCP duplicates (e.g., 415b) to be sent. A radio bearer being configured for duplication may have a set of associated RLC entities 425 and corresponding LCHs LCH1, LCH2. The set of RLC entities 425 may include a primary RLC entity 425a and one or more secondary RLC entities 425b but only a subset of the set of RLC entities is configured by the NW to be used for duplication. According to the NW configuration, a UE 500, 605 duplicates PDCP SDUs/PDUs and submits the PDCP PDU duplicates 415a, 415b, . . . to the configured RLC entities 425a, 425b associated with the LCHs 433 (depicted as LCH1, LCH2, . . . ). It should be noted that the maximum number of PDCP PDU duplicates 415a, 415b which the UE 500, 605 is supposed to transmit as configured by the NW may be smaller than the number of PDCP PDU duplicates generated respectively for the number of RLC entities/LCHs used for duplication as configured. In other words, a NW may configure a larger number of RLC entities/LCHs to be used for duplication than the number of PDCP duplicates which the UE 500, 605 is allowed to transmit in order to support high reliability requirement for e.g., URLLC traffic in a shared spectrum.

Given that in a shared spectrum, the UE 500, 605 needs to first get access to the channel before being able to make an uplink transmission, i.e., the UE 500, 605 needs to perform channel sensing/LBT operation before an uplink transmission, it may happen that the transmission of a MAC PDU containing a PDCP duplicate 415 cannot take place due to an unsuccessful CCA (LBT failure) which in turn may impact the reliability. Therefore, the UE 500, 605 may generate more PDCP duplicates 415 than are finally transmitted according to the NW configuration in accordance with this first embodiment and/or one or more compatible embodiments disclosed herein.

To give an example, the UE 500, 605 may have a radio bearer configured for duplication with 4 RLC entities 425, i.e., a PDCP entity 410 may be associated with one primary RLC 425a and 3 secondary RLC entities 425b. The NW may configure the UE 500, 605 such that all four RLC entities 425 are used for duplication, i.e., a primary RLC entity 425a and the three secondary RLC entities 425b, such that 4 copies of a PDCP PDU 415 are generated. Furthermore, in certain implementations, the NW may configure the maximum number of PDCP duplicates the UE 500, 605 is allowed to transmit to a value of 2. In order to ensure the transmission of two PDCP copies even in the case of LBT failures, the UE 500, 605 generates according to this embodiment and compatible embodiments, four copies of a PDCP PDU 415 which are ready for transmission even though in the end only two of the four copies are transmitted in the uplink. According to one implementation of the embodiment, the UE 500, 605 performs a LBT procedure for each of the uplink transmission of the four copies of the PDCP PDU 415. In existing systems, an assumption for PDCP duplication introduced in Rel-16 has been that a configured grant is allocated for each of the RLC entities of a duplication bearer, i.e., data of an RLC entity/LCH of a duplication bearer is mapped to a configured grant.

According to various implementations of embodiment 1 and compatible embodiments, for cases when the LBT procedure is successful for the transmission of more than two PDCP PDU duplicates 415, i.e., the number of successful LBTs is larger than maximum number of PDCP duplicates that the UE is allowed to transmit, the UE 500, 605 selects according to one implementation of the embodiment, which of the PDCP duplicates 415 to transmit, and thereby which of the configured grant ("CG") resources are used for transmission. Any remaining CG resource with successful LBTs can be skipped, or alternatively used for other transmissions by the UE 500, 605, e.g., for other PDUs or SDUs. According to another implementation of the embodiment, the NW may additionally configure the UE 500, 605 with the RLC entities 425 and corresponding LCHs which are in certain embodiments used by the UE 500, 605 for the transmission of PDCP duplicates 415 for the cases where the corresponding LBT is successful. According to one or more implementations of the first embodiment, the UE 500, 600 transmits at most as many PDCP duplicates 415 as configured by the NW even though the UE 500, 605 may have gotten access to the channel, i.e., the LBT was successful, for the transmission of further PDCP duplicates. The other generated MAC PDU(s) containing the further generated PDCP PDU duplicates which are not transmitted and are hence pending in the HARQ buffer of one or more HARQ entities 445 are discarded, according to one or more implementations of the first embodiment and compatible embodiments. Accordingly, there is no further (re)transmission of such MAC PDUs. Similarly, the corresponding RLC PDUs/ PDCP PDUs respectively RLC SDUs/PDCP SDUs multiplexed in those MAC PDUs are also discarded according to certain implementations. Moreover, when discarding the RLC PDU/SDU(s), the UE 500, 605 may reassign a Radio Link Control Sequence Number ("RLC SN") of the subsequent RLC PDUs in order to avoid a Sequence Number ("SN") gap to facilitate a RLC receiving window operation. Any remaining CG resource with a successful LBT may be skipped, or alternatively used for other transmissions by the UE 500, 600, e.g., for other PDUs or SDUs.

According to a second embodiment, a UE such as UE 500, 605 autonomously activates (e.g., enables without receiving explicit duplication activation instructions from the network) RLC entities 425 and corresponding LCHs 433 for PDCP duplication, e.g., secondary LCH(s) 433b, among the set of configured RLC entities 425 and corresponding LCHs 433 associated with a duplication radio bearer and submits PDCP PDU duplicates 415 to the autonomously activated RLC entities 425. Essentially, the UE 500, 605 generates more duplicates of a PDCP PDU 415 than configured by the NW entity. A radio bearer being configured for duplication may have a set of associated RLC entities 425 and corresponding LCHs 433—the set of RLC entities 425 including a primary RLC entity 425a and one or more secondary RLC entities 425b, but only a subset of the RLC entities 425 is configured by the NW to be used for duplication. In order to support high reliability transmissions (e.g., URLLC), PDCP duplication may be required. However, given that in a shared spectrum, the UE 500, 605 needs to first get access to the channel before being able to make an uplink transmission, i.e., the UE needs to perform LBT procedure before an uplink transmission, it may happen that the transmission of a MAC PDU containing a PDCP duplicate cannot take place due to a failed CCA, which, in turn will impact the reliability. Therefore, the UE 500, 605 will, according to the second embodiment and one or more compatible embodiments, proactively generate more PDCP duplicates than are configured by the network in order to ensure that the configured number of duplicates is finally transmitted. The UE 500, 605 duplicates, according to one implementation of the second embodiment, one or more PDCP SDU/PDU of a DRB configured for duplication at the PDCP transmitting entity and submits the one or more duplicate PDCP PDUs 415b to a set of secondary RLC entities 425b and corresponding LCHs 433b. It should be noted that the set of secondary RLC entities 425b used for duplication is bigger than the number of duplicates configured by the NW.

To give an example, a UE 500, 605 may have a radio bearer configured for duplication with four RLC entities, i.e., a PDCP entity 410 may be associated with one primary RLC and three secondary RLC entities. The network may configure the UE 500, 605 such that only two of the four RLC entities are used for duplication, i.e., the primary RLC entity and one secondary RLC entity, such that two copies of a PDCP PDU are transmitted. In order to ensure the transmission of two PDCP copies, even in the case of LBT failures 625, the UE 500, 605 autonomously activates the remaining two secondary RLC entities 425b for duplication in order generate two more copies of a PDCP SDU/PDCP PDU 415b which are ready for transmission in case of a LBT failure 625. Accordingly, the UE 500, 605 performs a LBT procedure 615 for uplink transmissions of the MAC PDUs containing PDCP PDUs of the two RLC entities 425b configured by the NW for duplication as well as for transmission of the additional two PDCP PDU duplicates 425b generated autonomously by the UE 500, 605.

In existing systems, an assumption for PDCP duplication introduced in Rel-16 has been that a configured grant is allocated for each of the RLC entities of a duplication bearer, i.e., data of a RLC entity/LCH of a duplication bearer is mapped to a configured grant. In case the LBT procedure is successful 620 for the transmission of the PDCP PDU copies of the two RLC entities configured by NW for duplication, the UE 500, 605 transmits only the two corresponding MAC PDUs and discards the other two generated MAC PDUs pending for transmission as well as the corresponding RLC PDUs/PDCP PDUs contained in the MAC PDUs. For cases when LBT/CCA 615 fails for a transmission of a PDCP PDU of the two RLC entities configured by the NW for duplication and LBT/CCA is successful for the transmission of an autonomously generated PDCP PDU duplicate, the UE transmits the corresponding MAC PDU containing the autonomously generated PDCP PDU duplicates 415b such that two PDCP PDU duplicates 415b are transmitted. The other generated MAC PDUs are discarded as well as the corresponding RLC PDUs/PDCP PDUs contained in the MAC PDU. Further when discarding the untransmitted RLC PDU(s) 415b, the UE 500, 605 reassigns a RLC SN of the subsequent RLC PDUs in order to avoid a SN gap, i.e., as this is important for the RLC receiving window operation.

According to a third embodiment, which may be implemented in connection with the first and second embodiments described about, a UE 500, 605 may transmit a TB containing a PDCP PDU duplicate 415 for which transmission could not take place in a HARQ process due to a failed LBT 625 in a different HARQ process being associated with a PUSCH for which an LBT was successful. As described in the first and second embodiments above, in order to support high reliability transmissions (URLLC) PDCP duplication is one technique which is used by the network. However, given that in a shared spectrum, the UE 500, 605 needs to first get access to the channel before being able to make an uplink transmission, i.e., the UE 500, 605 needs to perform a LBT procedure before an uplink transmission, it may happen that the transmission of a MAC PDU containing a PDCP duplicate cannot take place due to a failed LBT/CCA which in turn will impact the reliability. According to one implementation of this third embodiment, the NW configures which of the RLC entities/LCHs associated with the PDCP entity of a duplication bearer are to be used for PDCP duplication. The NW may only configure a subset of the configured RLC entities to be used for PDCP duplication. Accordingly, the UE 500, 605 generates PDCP PDU duplicates and submits them to the configured RLC entities/LCHs. As in Rel-16, the UE performs an LBT procedure for the transmission of the corresponding MAC PDUs containing the PDCP PDU duplicates. According to one implementation of the embodiment, the UE 500, 605, however, performs not only an LBT procedure for the UL grant(s) for which those MAC PDUs have been generated, but may also perform LBT on other UL grant(s) which are available for transmission. Such additional UL grants may be for example the UL grants associated with the other RLC entities of the duplication bearer which are not enabled for duplication according to NW configuration.

As mentioned above it is expected that SPS and Configured Grants (CG) will play a key role in serving the various co-existing traffic types expected in TSN networks. As a result, it is assumed that TSN streams carrying delay-sensitive data, e.g., URLLC traffic, requiring the support of a survival time is mapped onto an UL DRB which is configured with duplication across two or more legs, where the duplication is inactive by default. The associated LCHs are e.g., mapped onto configured grants (e.g., via a LCP restriction parameter such as LCH carrier restrictions 440) which are dimensioned such that the resources are well aligned with the data arrival time and also well dimensioned to carry a complete TSN message/PDCP SDU, so that RLC does not need to segment it.

In order to not delay the transmission of high priority packets such as PDCP PDU duplicates, which may not be acceptable for e.g., URLLC data, the UE 500, 605 may transmit a generated MAC PDU—for cases that LBT fails for the associated UL grant—on a different UL grant for which LBT was successful. Assuming that the TB size is the same for the UL grants for which UE performed LBT procedure, the internal mapping of TB(s) to different HARQ processes should not impose any technical problems.

According to a fourth embodiment, a UE 500, 605 selectively enables duplication for the transmission or retransmission of a MAC PDU containing a PDCP PDU 415 of a duplication bearer according to certain predefined criteria. In order to be able to transmit duplicate(s) of a PDCP PDU 415a for which the original PDCP PDU 415a was not transmitted due to a failed LBT 625, i.e., an LBT that failed for the (re)transmission of the MAC PDU containing the original PDCP PDU 415a, the duplicates of the original PDCP PDU 415a must be already available for transmission. Therefore, the UE 500, 605 duplicates, according to one implementation of the fourth embodiment, each PDCP SDU/PDU of a DRB configured for duplication at the PDCP transmitting entity and submits the duplicate(s) proactively to the one or more RLC entities 425 and corresponding logical channels 433 which are configured for PDCP duplication, i.e., also referred to as secondary LCHs. It should be noted that the duplication at the PDCP layer 405 is done even though duplicate transmissions are currently deactivated by NW, i.e., when PDCP PDUs are otherwise only transmitted via a single (primary) logical channel on PUSCH. According to one implementation UE selectively enables PDCP duplication for the transmission of PDCP PDUs of a radio bearer configured for duplication for cases that a MAC PDU containing a PDCP PDU of the radio bearer was not transmitted due to a failed LBT 625, i.e., an LBT that failed for the (re)transmission of the MAC PDU containing the original PDCP PDU 415. It should be noted that PDCP duplication is applied to the subsequent PDCP PDUs of the radio bearer.

According to one or more implementations of this fourth embodiment, a UE 500, 605 pre-generates one or more duplicate RLC PDUs upon receiving the duplicate PDCP PDUs from the PDCP transmitting entity at the RLC entity(ies) 425 associated with the one or more secondary LCHs 433 and stores the pre-generated RLC PDUs 427 at the respective RLC entities 425, i.e., store the RLC PDUs 427 that are pending for initial transmission. Generating an RLC PDU 427 implies that an RLC SN is associated with the PDCP PDU/RLC SDU received from PDCP layer 405 and a RLC header is generated (e.g., as further specified in 3GPP TS 38.322).

When pre-generating the one or more RLC PDUs, the UE 500, 605 may assume that no segmentation is needed, i.e., that a complete PDCP PDU 415 is contained in one RLC PDU. According to this implementation of the fourth embodiment, the UE 500, 605 discards the pre-generated RLC PDUs 427 of the secondary LCHs upon receiving an acknowledgement 635 from lower layers that an LBT was successful for the transmission of a MAC PDU containing the original PDCP PDU 415 carried on the (primary) LCH. By discarding the duplicate RLC PDUs 427 stored at the RLC layer 420 for the secondary LCH(s) 433, it is ensured that a duplication transmission is not performed for cases that the transmission of a PDCP PDU 415 was performed, i.e., LBT/CCA success, on the primary LCH. Hence a wastage of radio resources is avoided by discarding 640 duplicate RLC PDUs based on feedback 635 of LBT success.

Further, when discarding the pre-generated (but untransmitted) duplicate RLC PDUs 427b, the UE 500, 605 may reassigns the RLC SN of the subsequent RLC PDUs 427 in order to avoid a SN gap, i.e., this is important for the RLC receiving window operation. Upon receiving feedback from lower layers that LBT failed for the transmission of a MAC PDU carrying a PDCP PDU 415 of the primary LCH 433, the UE 500, 605 autonomously enables transmission of the pre-generated duplicate PDCP/RLC PDU(s) and optionally for further subsequent PDCP PDU transmissions according to one implementation of the fourth embodiment. To be more specific, when UE 500, 605 receives a LBT failure indication for the (initial) transmission of a MAC PDU containing an original PDCP/RLC PDU of the primary LCH, the UE performs a retransmission of this MAC PDU (carrying the data of the primary LCH), e.g., autonomous retransmission for the case that LBT failed for a configured grant transmission, and also in addition transmits the pre-generated RLC PDU(s) containing the duplicate PDCP PDU(s) for the secondary LCH(s) which are pending in the RLC layer for initial transmission.

The UE 500, 605 submits the pre-generated RLC PDUs to the MAC layer where corresponding MAC PDUs are generated and ultimately transmitted on the PUSCH(s), e.g., duplicates may be transmitted on other configured grants being scheduled/assigned for duplicate transmissions. The MAC PDU(s) containing the duplicated PDCP PDU(s) are for example transmitted with redundancy version (RV) zero or any other RV which ensures that the transmissions are self-decodable.

As mentioned above, it is expected that SPS and Configured Grants (CG) will play a key role in serving the various co-existing traffic types expected in TSN networks. As a result, it is assumed that TSN streams carrying delay-sensitive data, e.g., URLLC traffic, requiring the support of a survival time is mapped onto an UL DRB which is configured with duplication across two or more RLC entities 425 and corresponding LCHs 433. The associated LCHs 433 are e.g., mapped onto configured grants (e.g., via LCP restriction parameters 440) dimensioned such that the resources are well aligned with the data arrival time and also well dimensioned to carry a complete TSN message/PDCP SDU, so that RLC does not need to segment it.

According to a further embodiment, the UE 500, 605 receives configuration information that includes a priority threshold, which determines whether to apply the enhanced duplication schemes as outlined in various of the disclosed embodiments. For example, for cases when a bearer configured for duplication has an associated logical channel priority exceeding (alternatively being greater or equal) the configured threshold, the UE 500, 605 is allowed to apply some proactive generation of PDCP PDU duplicates 415 as outlined in the second embodiment or may transmit MAC PDUs containing PDCP PDU duplicates 415 on other UL resources than configured by NW as outlined in the third embodiment. Alternatively, the NW may explicitly configure for a bearer whether the enhanced duplication mechanisms as outlined in any of the disclosed embodiments are to be applied by the UE 505, 605.

According to a fifth embodiment, a UE 500, 605 discards a MAC PDU containing a PDCP PDU (duplicate) 415 which is pending in a HARQ buffer (e.g., in HARQ entities 445) for (re)transmission in case the successful decoding/transmission of another MAC PDU containing copy of the same PDCP PDU 415 was acknowledged by the receiver. The MAC PDU may be for example pending in a HARQ buffer due to a failed LBT for a transmission attempt. According to this implementation of the embodiment, the UE 500, 605 discards the MAC PDU containing a PDCP PDU duplicate 415 upon receiving an acknowledgement (ACK) from receiving entity for the transmission of another MAC PDU containing a copy of the same PDCP PDU 415.

In order to be able to discard the MAC PDU, the UE 500, 605/MAC layer 430 may need to check the PDCP SN of the PDCP PDU 415 contained in a MAC PDU, i.e., MAC layer 430 needs to parse the higher layer header. According to a further implementation, the UE 500, 605 further discards the duplicate PDCP PDU 415 and corresponding RLC SDU/RLC PDU 427. By discarding the duplicate PDUs stored at the RLC layer 420 and the PDCP layer 405, it is ensured that a duplication transmission is not performed for cases that the transmission of the PDCP PDU 415 was already performed successfully. Hence a wastage of radio resources is avoided by discarding duplicate RLC/MAC PDUs based on HARQ feedback from the receiving entity. Further when discarding duplicate RLC SDU/PDUs, the UE 500, 605 reassigns the RLC SN of the subsequent RLC PDUs 427 in order to avoid a SN gap, i.e., this is important for the RLC receiving window operation.

According to a sixth embodiment, a UE 500, 605 increases the channel access priority class, i.e., adopts a lower channel access priority class value, for the next transmission attempt of the same MAC PDU in case the previous transmission attempt was not successful, i.e., when the MAC PDU could not be transmitted on PUSCH due to a LBT failure. If for example a channel access priority class of value 3 was used for a transmission attempt, then UE 500,

605 may according to this embodiment use the channel access priority class of value '2' for the next transmission attempt of the same TB. According to another implementation of this embodiment, the UE 500, 605 may use a short LBT for a next transmission attempt of a MAC PDU for cases that LBT failed for the previous transmission attempt. Increasing the Channel Access Priority Class ("CAPC") or using only short LBT may increase the probability of a LBT success for the next transmission attempt, which may be important in order to avoid for example a situation where survival time 245 expires.

Especially at higher carrier frequencies, multiple beams may operate nominally on the same cell, where the spatial characteristic of each beam can ensure that there is little correlation of the channel characteristics, thereby enabling another degree of diversity. It is therefore possible in all disclosed embodiments that the cell restriction functionality (described above in the context of CA/DC duplication LCH carrier restrictions 440) does not need to be upheld. For example, duplicated packets may be transmitted on the same cell with different beams. To this end, exemplarily a respective CG resource can be configured with a spatial relation information (representing a beam, for example, using a TCI index/SRI index). Additional configuration information may indicate which of the spatial relations (representing a beam) is used for the transmission of an LCH associated with a duplication radio bearer.

In certain embodiments, the apparatuses, systems, and methods disclosed herein provide enhanced PDCP duplication operation in a shared spectrum. In such embodiments, a NW configures/activates 'n' RLC entities/LCHs of a duplication bearer which are used for PDCP duplication, i.e., the UE generates n PDCP duplicates. The NW further configures 'x', the maximum number of duplicates to be transmitted by the UE, where x<n.

Further, the UE performs an LBT procedure for all n MAC PDUs carrying the n PDCP duplicates. If the number of successful LBT is larger than x, then the UE selects which PDCP duplicates to transmit.

In some embodiments, a UE autonomously activates RLC entities/LCH of a duplication for PDCP duplication. In such embodiments, the UE autonomously generates additional PDCP duplicates (NW configured the UE to generate a certain number of duplicates) and performs LBT procedure for the transmission of the corresponding MAC PDUs in order to increase the probability of LBT success for the configured number of PDCP duplicates.

In various embodiments, a UE autonomously activates PDCP duplication for cases when LBT fails for the transmission of the original PDCP PDU. In such embodiments, the UE pre-generates PDCP duplicates which are ready for transmission in case of LBT failure and the UE discards the pre-generated PDCP duplicates in a case in which LBT success is indicated for the transmission of the original PDCP PDU.

In certain embodiments, a UE increases the CAPC for cases when LBT fails for the transmission on a configured grant in order to increase the likelihood of a LBT success for the autonomous retransmission of the TB.

Figure 7:
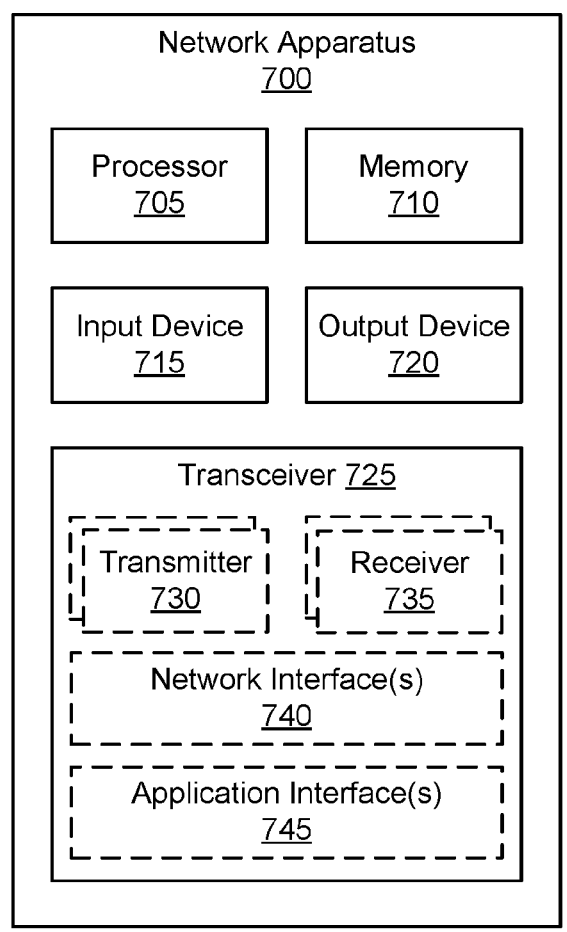
FIG. 7 is a block diagram illustrating one embodiment of a network equipment apparatus that may be used for selectively enabling PDCP duplication for a data radio bearer in a network that supports shared spectrum, in accordance with one or more embodiments of the disclosure.

FIG. 7 depicts one embodiment of a network equipment apparatus 700 that may be used for configuring duplication of PDCP PDUs for a radio bearer, according to one or more embodiments of the disclosure. The network equipment apparatus 700 may be an instance of the base unit 110 and/or the gNB 610 (described with respect to FIGS. 1 and 6. Furthermore, the network equipment apparatus 700 may include a processor 705, a memory 710, an input device 715, an output device 720, and a transceiver 725. In some embodiments, the input device 715 and the output device 720 are combined into a single device, such as a touch screen. In certain embodiments, the network equipment apparatus 700 does not include any input device 715 and/or output device 720.

As depicted, the transceiver 725 includes at least one transmitter 730 and at least one receiver 735. Additionally, the transceiver 725 may support at least one network interface 770. Here, the at least one network interface 740 facilitates communication with a remote unit 105, such as the UE 500, 605, with other network functions in a mobile core network 140, such as the UPF 141, AMF 143, and the like.

The processor 705, in one or more embodiments, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In certain embodiments, the network equipment apparatus 700 may be involved in performance of various steps of UE methods for selectively (e.g., autonomously) enabling PDCP duplication such as for example, communication configuration information to the UE indicating the number of duplicate PDCP PDUs that may be generated or communication other configuration information described above.

Figure 8:
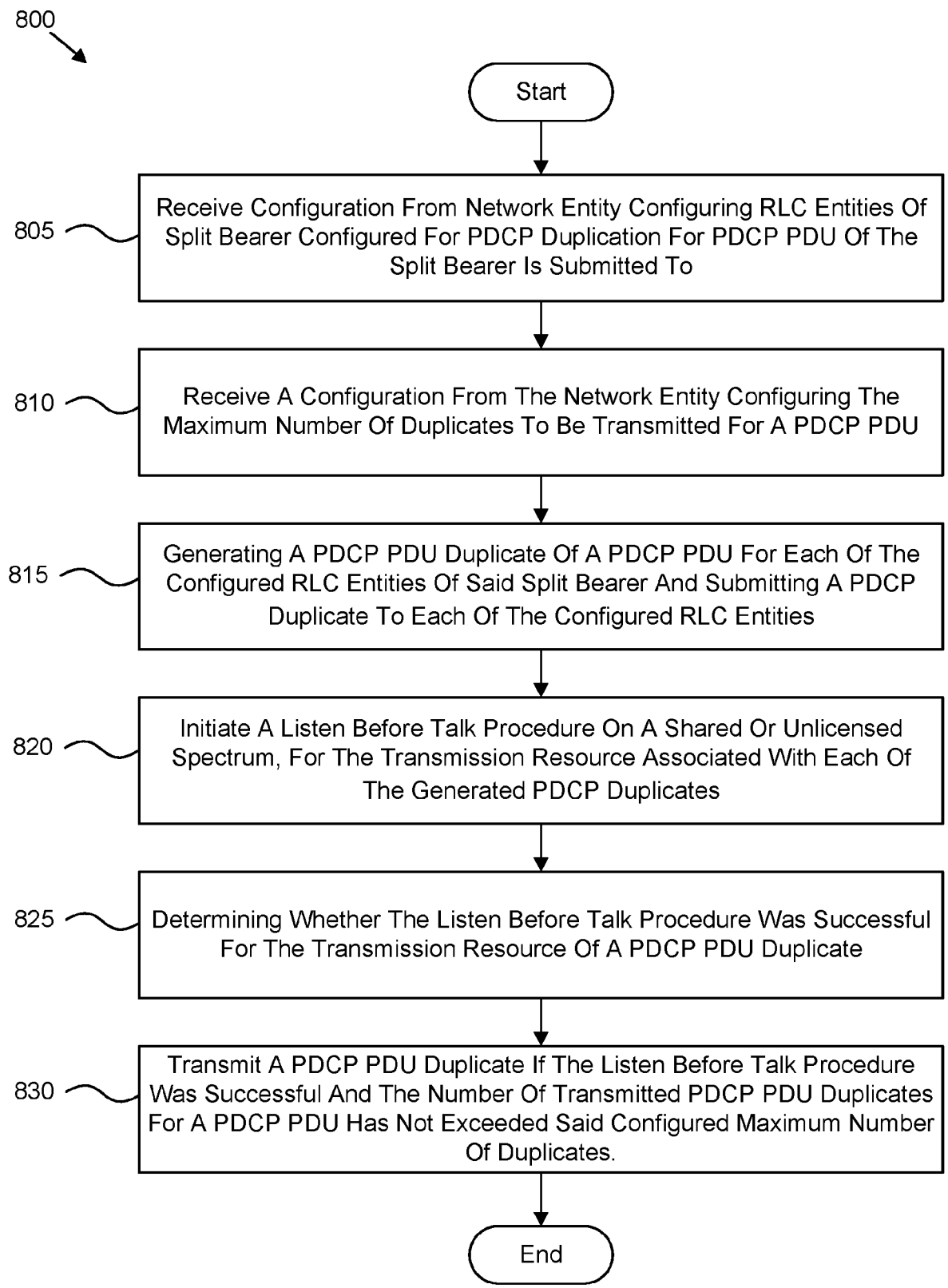
FIG. 8 is a flow chart diagram illustrating a method that may be used for selectively enabling PDCP duplication for a data radio bearer in a network that supports shared spectrum, in accordance with one or more examples of the disclosure.

FIG. 8 is a flow chart diagram illustrating one embodiment of a method 800 that may be used for increasing the transmission reliability for transmissions of a duplication bearer in a shared or unlicensed spectrum.

In certain embodiments, the method 800 is performed by a user equipment device ("UE"). In one or more embodiments, the method 800 includes receiving 802 a configuration from a network entity configuring the RLC entities of a split bearer configured for PDCP duplication a PDCP PDU of said split bearer is submitted to. In certain embodiments, method 800 continues and includes receiving 804 a configuration from the network entity configuring the maximum number of duplicates to be transmitted for a PDCP PDU. In some embodiments, method 800 continues and includes generating 806 a PDCP PDU duplicate of a PDCP PDU for each of the configured RLC entities of said split bearer and submitting a PDCP duplicate to each of the configured RLC entities. In various embodiments, the method 800 continues and includes initiating 808 a listen before talk procedure on a shared or unlicensed spectrum, for the transmission resource associated with each of the generated PDCP PDU duplicates. In certain embodiments, the method 800 continues and includes determining 810 whether the listen before talk procedure was successful or not for the transmission resource of a PDCP PDU duplicate. In some embodiments, the method 800 continues and includes transmitting 812 a PDCP PDU duplicate if the listen before talk procedure was successful and the number of transmitted PDCP PDU duplicates for a PDCP PDU has not exceeded said configured maximum number of duplicates and the method 800 ends.

In some embodiments, the number of configured RLC entities a PDCP PDU duplicate is submitted to is greater than the configured maximum number of duplicates.

In certain embodiments, the UE forms a MAC PDU for each of the PDCP PDU duplicate submitted to the configured RLC entities, said MAC PDU being comprised of a PDCP PDU duplicate.

In various embodiments, the method 800 and/or various implementations thereof may be implemented using the remote unit 105 depicted in FIG. 2 of the present disclosure.

Figure 9:
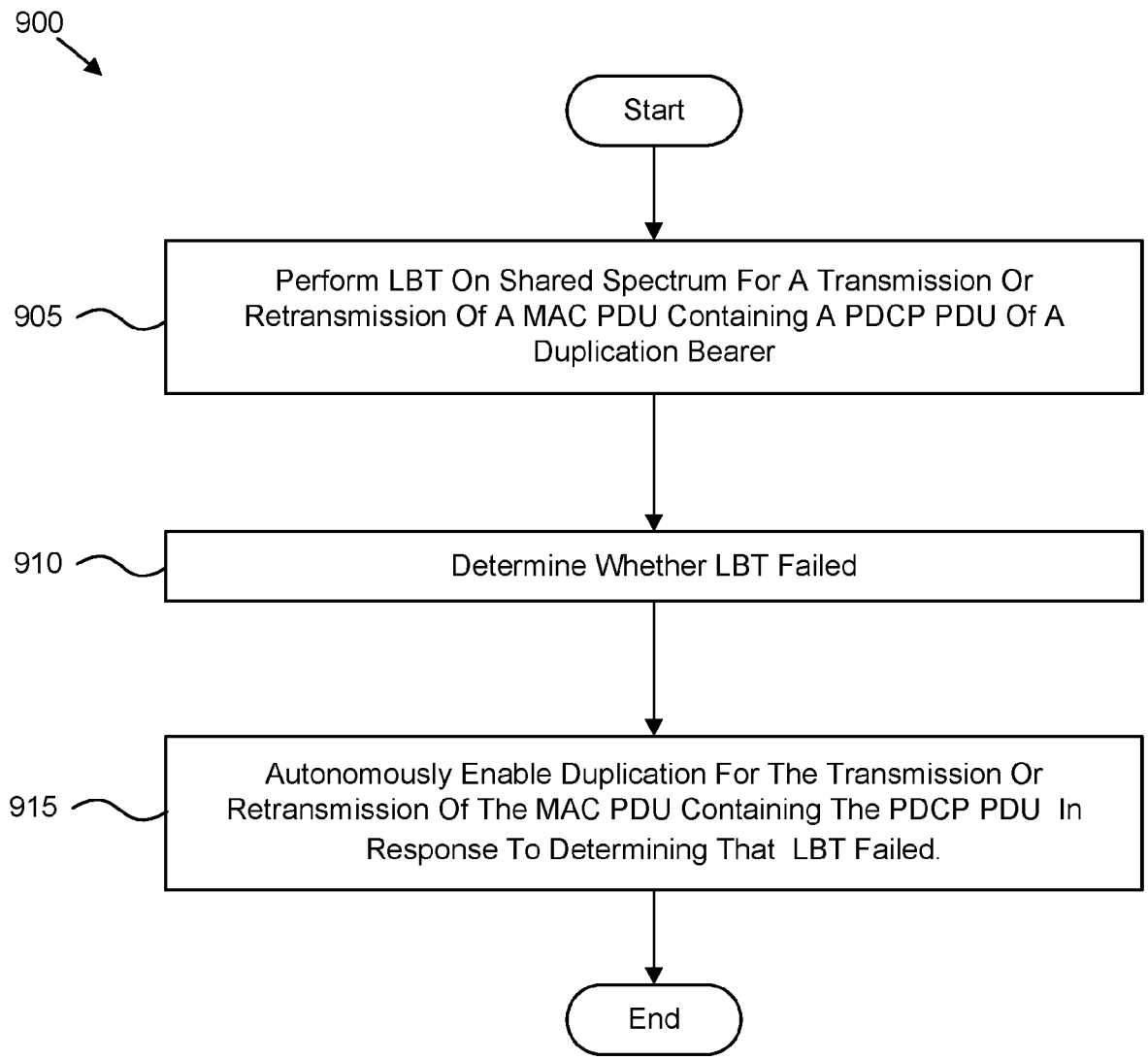
FIG. 9 is a flow chart diagram illustrating another method that may be used for selectively enabling PDCP duplication for a data radio bearer in a network that supports shared spectrum, in accordance with one or more embodiments of the disclosure.

FIG. 9 is a flow chart diagram illustrating another method 900 that may be used for selectively enabling PDCP duplication for a data radio bearer in a network that supports shared spectrum, in accordance with one or more embodiments of the disclosure.

In various embodiments, the method 900 begins and includes initiating 905 a listen before talk procedure ("LBT") on shared spectrum, for a transmission of a medium access control ("MAC") protocol data unit ("PDU") containing an original packet data convergence protocol ("PDCP") PDU of a data radio bearer ("DRB") configured for PDCP duplication, where PDCP duplication is deactivated for the data radio bearer. The method 900 continues and further includes determining 910 whether the LBT failed or succeeded. The method 900 continues and further includes selectively enabling 915 PDCP duplication for the data radio bearer configured for duplication in response to determining that the PDCP PDU was not transmitted due to failure of the LBT.

In various embodiments, the apparatuses, systems, and methods disclosed herein, provide a useful aspect of enabling an enhanced PDCP duplication operation in a shared or unlicensed spectrum by reducing the impact of LBT failures for the transmission of PDCP duplicates for reliability and latency critical URLLC traffic. A second aspect is to autonomously enable PDCP duplication in the event of an LBT failure in order to avoid that the survival timer associated with a bearer expires.

In some embodiments, a NW configures the UE to generate a higher number of PDCP duplicates than the number of duplicates which UE is ultimately allowed to transmit in the uplink to the receiver. By generating a higher number of PDCP duplicates and performing LBT procedure for all the generated PDCP duplicates respectively the MAC PDU carrying such PDCP duplicates, the probability of LBT success for the number of duplicates the UE is ultimately transmitting is increased. By autonomously enabling PDCP duplication in the UE for the case that LBT failed for a transmission attempt of a packet increases the probability that the packet is successfully transmitted within the required delay budget.

The various embodiments disclosed herein provide certain advantages over other implementations that rely on autonomous retransmissions for the case that an LBT failure occurred for the transmission of a PDCP PDU duplicate, which increases the latency of a data packet transmission and may even cause the expiry of a survival timer trigger the application to transition the status of the communication service into a down state. By enabling autonomously PDCP duplication for cases when LBT failed for a previous transmission attempt of a packet or by increasing the number of LBT trials for the transmission of PDCP duplicates, the transmission reliability is increased and the latency for a packet transmission is reduced.

In one aspect, a UE generates a configured number of PDCP duplicates and performs LBT procedure for the transmission of the corresponding MAC PDUs carrying the PDCP PDU duplicates. The UE transmits only a subset of the generated PDCP duplicates/MAC PDUs for which LBT procedure was successful. NW configures the UE with the maximum of duplicates which the UE is allowed to transmit; the other PDCP duplicates/MAC PDUs are discarded.

In another aspect, a UE autonomously pre-generates duplicates of a PDCP PDU and submits them to the configured RLC entities of a duplication bearer. When LBT fails for the transmission of a PDCP PDU, the UE autonomously generates MAC PDU carrying the pre-generated PDCP duplicates and performs LBT procedure for such MAC PDUs in a subsequent transmission occasion.

A User Equipment ("UE") apparatus for a mobile network ("NW") is disclosed that includes a transceiver that initiates a listen before talk procedure ("LBT") on shared spectrum, for a transmission of a medium access control ("MAC") protocol data unit ("PDU") containing an original packet data convergence protocol ("PDCP") PDU of a data radio bearer ("DRB") configured for PDCP duplication, wherein PDCP duplication is deactivated for the data radio bearer. In various embodiments, the apparatus includes a processor that: determines whether the LBT failed or succeeded; and selectively enables PDCP duplication for the data radio bearer configured for duplication in response to determining that the PDCP PDU was not transmitted due to failure of the LBT.

In some embodiments, prior to performing the LBT, the UE duplicates the original PDCP PDU and submits duplicate PDCP PDUs to one or more RLC entities associated with a PDCP entity of the data radio bearer and corresponding logical channels ("LCHs") selected from a primary LCH and one or more secondary LCHs.

In certain embodiments, the UE duplicates the original PDCP PDU whether or not duplicate transmissions are currently deactivated by the NW.

In various embodiments in response to receiving duplicate PDCP PDUs from a PDCP transmitting entity at the one or more RLC entities, the UE pre-generates and stores corresponding RLC PDUs at the one or more RLC entities pending a transmission of the duplicates.

In one or more embodiments, UE pre-generates the corresponding RLC PDUs without segmentation such that each PDCP PDU is contained in one RLC PDU.

In some embodiments, in response to receiving feedback from lower layers that an LBT failed for the transmission of the MAC PDU containing the original PDCP PDU carried on the primary LCH, the UE retransmits the MAC PDU containing the original PDCP PDU on the primary LCH and transmits the pre-generated RLC PDUs stored at the RLC entities corresponding to one or more secondary LCHs.

In various embodiments, in response to receiving an acknowledgement from lower layers that an LBT succeeded for the transmission of a MAC PDU containing the original PDCP PDU corresponding to the primary LCH, the UE discards the RLC PDUs stored at the RLC entities corresponding to the one or more secondary LCHs.

In certain embodiments, the UE reassigns an RLC sequence number ("SN") of subsequent RLC PDUs to avoid a SN gap being caused by discarding pending duplicate RLC PDUs that were not transmitted.

In one or more embodiments, the UE further submits the pre-generated RLC PDUs to the MAC layer and generates MAC PDUs containing the duplicated PDCP PDUs for transmission on one or more physical uplink shared channels ("PUSCHs").

In some embodiments, generated MAC PDUs are transmitted with a redundancy version that ensures that the transmissions are self-decodable.

In various embodiments, prior to selectively enabling PDCP duplication of the original PDCP PDU in response to determining that the PDCP PDU was not transmitted due to failure of the LBT, the UE receives configuration information including a priority threshold that indicates which of one or more predetermined duplication modes to use.

In certain embodiments, in response to receiving an acknowledgement of successful transmission and decoding of a MAC PDU containing the same PDCP PDU that was duplicated, the UE discards a copy of the MAC PDU pending in a HARQ buffer for transmission.

In one or more embodiments, the UE further discards one or more corresponding duplicate PDCP PDUs and RLC PDUs pending in a HARQ buffer for transmission based on HARQ feedback from a receiving entity.

In various embodiments, the UE reassigns an RLC sequence number ("SN") of subsequent RLC PDUs to avoid a SN gap being caused by discarding the pending duplicate RLC PDUs that were not transmitted.

In some embodiments, in response to determining that the transmission of the MAC PDU containing the original PDCP PDU was unsuccessful due to an LBT failure, the UE performs one or more of:
  adopting a lower channel access priority class value for subsequent retransmission attempts of one or more MAC PDUs carrying the PDCP PDU duplicates; and
  using a short LBT for subsequent retransmission attempts of one or more MAC PDUs carrying the PDCP PDU duplicates.

A method is disclosed for increasing transmission reliability for transmissions of a duplication bearer in a network ("NW") that supports shared spectrum. In various embodiments, the method includes initiating a listen before talk procedure ("LBT") on shared spectrum, for a transmission of a medium access control ("MAC") protocol data unit ("PDU") containing an original packet data convergence protocol ("PDCP") PDU of a data radio bearer ("DRB") configured for PDCP duplication, where PDCP duplication is deactivated for the data radio bearer. The method further includes determining whether the LBT failed or succeeded and selectively enabling PDCP duplication for the data radio bearer configured for duplication in response to determining that the PDCP PDU was not transmitted due to failure of the LBT.

In some embodiments, the method includes duplicating the original PDCP PDU prior to performing the LBT and submitting duplicate PDCP PDUs to one or more RLC entities associated with a PDCP entity of the data radio bearer and corresponding logical channels ("LCHs") selected from a primary LCH and one or more secondary LCHs.

In one or more embodiments, the method includes duplicating the original PDCP PDU is performed whether or not duplicate transmissions are currently deactivated by the NW.

In certain embodiments, the method includes, in response to receiving duplicate PDCP PDUs from a PDCP transmitting entity at the one or more RLC entities, pre-generating and storing corresponding RLC PDUs at the one or more RLC entities pending a transmission of the duplicates.

In some embodiments, the method includes pre-generating the corresponding RLC PDUs without segmentation such that each PDCP PDU is contained in one RLC PDU.

In various embodiments, in response to receiving feedback from lower layers that an LBT failed for the transmission of the MAC PDU containing the original PDCP PDU carried on the primary LCH, the UE retransmits the MAC PDU containing the original PDCP PDU on the primary LCH and transmits the pre-generated RLC PDUs stored at the RLC entities corresponding to one or more secondary LCHs.

In one or more embodiments, in response to receiving an acknowledgement from lower layers that an LBT succeeded for the transmission of a MAC PDU containing the original PDCP PDU corresponding to the primary LCH, the UE discards the RLC PDUs stored at the RLC entities corresponding to the one or more secondary LCHs.

In certain embodiments, the UE reassigns an RLC sequence number ("SN") of subsequent RLC PDUs to avoid a SN gap being caused by discarding pending duplicate RLC PDUs that were not transmitted.

In some embodiments, the UE submits the pre-generated RLC PDUs to the MAC layer and generates MAC PDUs containing the duplicated PDCP PDUs for transmission on one or more physical uplink shared channels ("PUSCHs").

In various embodiments, the method includes transmitting the generated MAC PDUs with a redundancy version that ensures that the transmissions are self-decodable.

In one or more embodiments, the method includes receiving at a UE performing the transmissions configuration information comprising a priority threshold that indicates which of one or more predetermined duplication modes to use, wherein the configuration information is received prior to selectively enabling PDCP duplication of the original PDCP PDU in response to determining that the PDCP PDU was not transmitted due to failure of the LBT.

In certain embodiments, the method includes discarding a copy of the MAC PDU pending in a HARQ buffer for transmission in response to receiving an acknowledgement of successful transmission and decoding of a MAC PDU containing the same PDCP PDU that was duplicated.

In some embodiments, the method includes discarding one or more corresponding duplicate PDCP PDUs and RLC PDUs pending in the HARQ buffer for transmission based on HARQ feedback from a receiving entity.

In various embodiments, the method includes reassigning a RLC sequence number ("SN") of subsequent RLC PDUs to avoid a SN gap being caused by discarding the pending duplicate RLC PDUs that were not transmitted.

In one or more embodiments, the method includes, in response to determining that the transmission of the MAC PDU containing the original PDCP PDU was unsuccessful due to an LBT failure, performing one or more of:
  adopting a lower channel access priority class value for subsequent retransmission attempts of one or more MAC PDUs carrying the PDCP PDU duplicates; and
  using a short LBT for subsequent retransmission attempts of one or more MAC PDUs carrying the PDCP PDU duplicates.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A User Equipment ("UE") comprising:
  a memory; and
  a processor coupled to the memory, the processor configured to cause the UE to:
    duplicate an original packet data convergence protocol ("PDCP") protocol data unit ("PDU") of a data radio bearer ("DRB") configured for PDCP duplication, while PDCP duplication is deactivated for the DRB;

initiate a listen before talk procedure ("LBT") on shared spectrum after duplicating the original PDCP PDU, wherein the LBT procedure is for transmission of a medium access control ("MAC") PDU containing the original PDCP PDU;

determine whether the LBT failed or succeeded; and activate PDCP duplication for the DRB in response to determining that the PDCP PDU was not transmitted due to failure of the LBT.

2. The UE of claim 1, wherein prior to performing the LBT, the processor is configured to cause the UE to submit duplicate PDCP PDUs to one or more radio link control ("RLC") entities associated with a PDCP entity of the data radio bearer and corresponding logical channels ("LCHs") selected from a primary LCH and one or more secondary LCHs.

3. The UE of claim 1, wherein in response to receiving duplicate PDCP PDUs from a PDCP transmitting entity at one or more radio link control ("RLC") entities, the processor is configured to cause the UE to pre-generate and store corresponding RLC PDUs at the one or more RLC entities pending a transmission of the duplicate PDCP PDUs.

4. The UE of claim 3, wherein the processor is configured to cause the UE to pre-generate the corresponding RLC PDUs without segmentation and each PDCP PDU is contained in one RLC PDU.

5. The UE of claim 3, wherein in response to receiving feedback from lower layers of the failure of the LBT for the transmission of the MAC PDU containing the original PDCP PDU carried on a primary logical channel ("LCH"), the processor is configured to cause the UE to retransmit the MAC PDU containing the original PDCP PDU on the primary LCH and transmit the pre-generated RLC PDUs stored at the RLC entities corresponding to one or more secondary LCHs.

6. The UE of claim 5, wherein in response to receiving an acknowledgement from the lower layers that a subsequent LBT succeeded for the transmission of a MAC PDU containing the original PDCP PDU corresponding to the primary LCH, the processor is configured to cause the UE to discard the pre-generated RLC PDUs stored at the RLC entities corresponding to the one or more secondary LCHs.

7. The UE of claim 6, wherein the processor is configured to cause the UE to reassign an RLC sequence number ("SN") of subsequent RLC PDUs to avoid a SN gap being caused by discarding pending duplicate RLC PDUs that were not transmitted.

8. The UE of claim 3, wherein the processor is configured to cause the UE to submit the pre-generated RLC PDUs to a MAC layer and generate MAC PDUs containing the duplicated PDCP PDUs for transmission on one or more physical uplink shared channels ("PUSCHs").

9. The UE of claim 8, wherein generated MAC PDUs are transmitted with a redundancy version that ensures that the transmissions are self-decodable.

10. The UE of claim 1, wherein prior to activating PDCP duplication for the DRB in response to determining that the PDCP PDU was not transmitted due to failure of the LBT, the processor is configured to cause the UE to receive configuration information comprising a priority threshold that indicates which of one or more predetermined duplication modes to use.

11. The UE of claim 1, wherein in response to receiving an acknowledgement of successful transmission and decoding of a respective MAC PDU containing the original PDCP PDU, the processor is configured to cause the UE to discard a copy of the MAC PDU pending in a hybrid automatic repeat request ("HARQ") buffer for transmission.

12. The UE of claim 11, wherein the processor is configured to cause the UE to further discard one or more corresponding pending duplicate PDCP PDUs and one or more pending duplicate radio link control ("RLC") PDUs in a hybrid automatic repeat request ("HARQ") buffer for transmission based on HARQ feedback from a receiving entity.

13. The UE of claim 12, wherein the processor is configured to cause the UE to reassign an RLC sequence number ("SN") of subsequent RLC PDUs to avoid a SN gap being caused by discarding the one or more pending duplicate RLC PDUs.

14. The UE of claim 1, wherein in response to determining that the transmission of the MAC PDU containing the original PDCP PDU was unsuccessful due to failure of the LBT, the processor is configured to cause the UE to:

adopt a lower channel access priority class value for subsequent retransmission attempts of one or more MAC PDUs carrying PDCP PDU duplicates; and/or use a short LBT for subsequent retransmission attempts of one or more MAC PDUs carrying the PDCP PDU duplicates.

15. A method performed by a user equipment ("UE"), the method comprising:

duplicating an original packet data convergence protocol ("PDCP") protocol data unit ("PDU") of a data radio bearer ("DRB") configured for PDCP duplication, while PDCP duplication is deactivated for the DRB;

initiating a listen before talk procedure ("LBT") on shared spectrum after duplicating the original PDCP PDU, wherein the LBT procedure is for a transmission of a medium access control ("MAC") PDU containing the original PDCP PDU;

determining whether the LBT failed or succeeded; and activating PDCP duplication for the DRB in response to determining that the PDCP PDU was not transmitted due to failure of the LBT.

16. The method of claim 15, wherein prior to performing the LBT, the method further comprises:

submitting duplicate PDCP PDUs to one or more radio link control ("RLC") entities associated with a PDCP entity of the data radio bearer and corresponding logical channels ("LCHs") selected from a primary LCH and one or more secondary LCHs.

17. The method of claim 15, wherein in response to receiving duplicate PDCP PDUs from a PDCP transmitting entity at one or more radio link control ("RLC") entities, the method further comprises pre-generating and storing corresponding RLC PDUs at the one or more RLC entities pending a transmission of the duplicate PDCP PDUs.

18. The method of claim 15, wherein prior to activating PDCP duplication for the DRB in response to determining that the PDCP PDU was not transmitted due to failure of the LBT, the method further comprises receiving configuration information comprising a priority threshold that indicates which of one or more predetermined duplication modes to use.

19. The method of claim 15, wherein in response to receiving an acknowledgement of successful transmission and decoding of a respective MAC PDU containing the original PDCP PDU, the method further comprises discarding a copy of the MAC PDU pending in a hybrid automatic repeat request ("HARQ") buffer for transmission.

20. The method of claim 15, wherein in response to determining that the transmission of the MAC PDU containing the original PDCP PDU was unsuccessful due to failure of the LBT, the method further comprises:
- adopting a lower channel access priority class value for subsequent retransmission attempts of one or more MAC PDUs carrying PDCP PDU duplicates; and/or
- using a short LBT for subsequent retransmission attempts of one or more MAC PDUs carrying the PDCP PDU duplicates.

* * * * *